United States Patent [19]
Wally
[11] 3,751,601
[45] Aug. 7, 1973

[54] TAPE PLAYBACK FOR PLAYING THROUGH A RADIO RECEIVER

[76] Inventor: Harry W. Wally, 36 Plaza St., Brooklyn, N.Y. 11238

[22] Filed: Nov. 17, 1971

[21] Appl. No.: 199,477

Related U.S. Application Data

[63] Continuation-in-part of Ser. No. 663, Jan. 5, 1970.

[52] U.S. Cl. .................. 179/100.11, 179/100.2 CA
[51] Int. Cl. ............................................ G11b 31/00
[58] Field of Search .................. 179/100.11, 100.22, 179/1 SW, 100.2 CA, 700.2 MD; 307/112; 325/311

[56] References Cited

UNITED STATES PATENTS

| | | | |
|---|---|---|---|
| 2,959,644 | 11/1960 | Grace | 179/100.11 |
| 3,646,278 | 2/1972 | Panizzi | 179/100.11 |
| 3,505,486 | 4/1970 | Lear et al. | 179/100.11 |
| 3,541,273 | 11/1970 | Lyon, Jr. et al. | 179/100.11 |
| 2,867,389 | 1/1959 | Viets | 179/100.11 |
| 3,270,131 | 8/1966 | Dinter | 179/100.11 |
| 2,941,737 | 6/1960 | Jones | 179/100.11 |

*Primary Examiner*—Raymond F. Cardillo, Jr.
*Attorney*—La Forest S. Saulsbury et al.

[57] ABSTRACT

A playback system for a multitrack prerecorded tape cartridge or cassette includes a tape playback adapter for inserting the cartridge or cassette therein. The adapter includes a motor for driving the tape, a magnetic head for picking up audio signals from the tape, both a manual switch and an automatic switch (actuateable by the cartridge insertion) for selecting a particular track, a channel (track) indicator, an audio amplifier to amplify the picked up audio signals, a tunable radio frequency oscillator for generating a carrier, and a modulator for modulating the audio signals on the oscillator. The modulator is connectable via an automatic selector switch also (actuateable by the cartridge insertion) to the radio frequency input terminal of an amplitude or frequency modulated radio broadcast receiver. A radio frequency antenna is also connectable to the radio frequency input terminal via the selector switch. An antenna ground switch also actuateable by the cartridge insertion. Both radio receiver and adapter are energized by a battery power supply connected to both the adapter and radio receiver. The automatic track switch is actuateable by a conducting surface carried on the tape, and the track switches include a spark-supressing condenser across their opposing electrical termals circuitry.

12 Claims, 4 Drawing Figures

TAPE PLAYBACK FOR PLAYING THROUGH A RADIO RECEIVER

This application is a continuation-in-part and improvement of the invention of parent U.S. Ser. No. 663 filed Jan. 5, 1970.

This invention concerns a tape cartridge or cassette playback adapter for playing through an automobile or home radio receiver or a portable radio receiver. Tape cartridge and cassette players heretofore known, have generally included a magnetic pickup head, tape drive motor, audio amplifier, one or more loudspeaker, and battery power supply all embodied in a single unit. Some of these units have included an audio output jack for connecting the output to an external loudspeaker. Due to their small size and for cost and other considerations, the prior tape cartridge or cassette players were not able to provide high audio reproduction quality. Since the prerecorded tape in a tape cartridge generally covers a rather wide audio frequency range, the reproduction limitations of the conventional tape cartridge or cassette player leaves much to be desired. When such a tape player is used in an automobile, the radio receiver in the automobile is turned off. Thus the high quality radio receiver is not used, while the low quality audio program of the tape cartridge or cassette player is being played. Hereafter, the term "cartridge" shall be deemed to refer to cassettes also.

The present invention is directed at providing a tape playback device whereby the radio receiver in the automobile will be used in conjunction with the tape playback device. According to the invention, the playback device includes a drive motor for driving the prerecorded tape in a cartridge when the cartridge is inserted into the device. A magnetic pickup head picks up the recorded program from a selected track on the tape and feeds the audio frequency signals to an audio amplifier. This audio amplifier drives an amplitude or frequency modulator which modulates the audio signals on a carrier provided by a tunable radio frequency oscillator preferably in the range of approximately 1,200 kilocycles to 1,450 kilocycles. The modulated radio frequency signals are then applied via a selector switch to the radio frequency input terminal of an automobile radio receiver operating on amplitude or frequency modulation. The selector switch alternatively (1) will connect the tape playback or player adapter to the radio receiver or (2) will connect the radio antenna carried by the automobile to the radio receiver. The modulated radio frequency carrier fed to the radio receiver will be demodulated in the radio receiver, amplified in the audio amplifier of the receiver and reproduced by the loudspeaker of the radio receiver. The automobile battery which energizes the radio receiver is also to energize the tape playback adapter. By the system described, the tape playback adapter is integrated into radio and audio reproduction system in the automobile.

There are both manual and automatic tracks switches actuateable of a selenoid mechanism switchable of the pickup head between optional tape-track position — i.e. from one channel to another. Between the hot and cold wires of the track switches extends a spark-suppressing condenser. Preferably the electrical circuit of the motor lining the tape, has a hot wire (to which the motor is attachable) attached directly to the power source — i.e. preferably not through the track switch circuit having the condenser in parallel, whereby there is less probability of poor switch connections and/or voltage fluctuations resulting from a multipurpose circuit, thus a more direct power circuit avoiding fluctuations in power to the tape drive motor to thereby assure true and steady reproduction of sound as the tape moves at a more constant speed past the pickup head. The motor hot wire preferably includes an automatic motor-drive switch.

The antenna lead preferably includes a condensor in electrical series between the antenna and the above-noted selector switch, together with the antenna being attached to a ground through an automatic ground switch.

The track automatic switch, the automatic tape-drive motor switch, and the automatic track switch are preferably each actuateable by insertion of the tape cartridge. The switches preferably are a gang switch.

The particular automatic selenoid switch preferably is actuated by completion of (closing of) electrical circuitry by contact of terminals of the contact terminals with any suitable electrical-conducting surface on the tape surface such as tin-foil, for example.

The tape playback adapter itself employs transistorized circuitry. The loudspeaker or loudspeakers, battery supply, and high power audio amplifier stage of the conventional cartridge tape player are all eliminated. Important savings in manufacturing cost are thus realized. At the same time improved audio reproduction of the prerecorded tape in the automobile is effected. No changes are required in the radio receiver. Installation of the tape playback adapter involves a few simple connections to the battery of the automobile to the radio receiver and to the radio antenna. No special tools or skills are required to install the tape playback adapter and therby interate it into the radio and electrical system of the automobile.

The invention will be explained in further detail in connection with the drawings wherein:

FIG. 3 is a schematic representation of the tape drive, the track (channel) selector, channel indicator, and the like.

FIG. 4 is an in-part view taken along lines 4—4, illustrating a cross-section of an intermittent tensile conductor mounted on the tape face.

Figure 1:
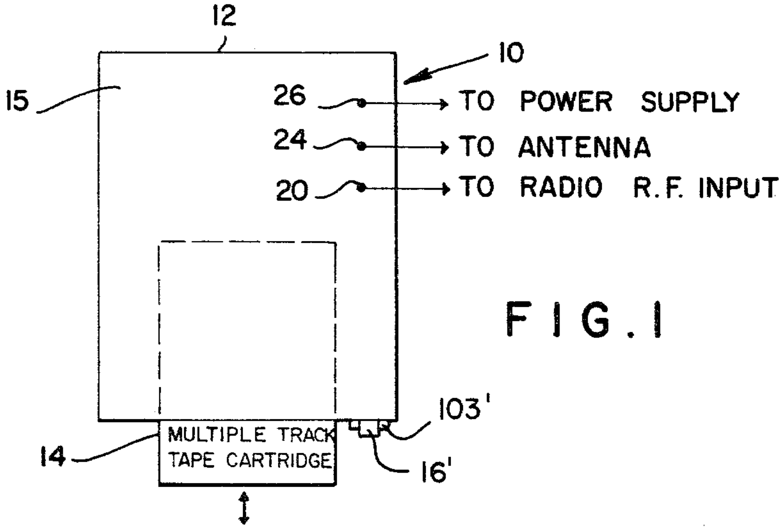
FIG. 1 is a top plan view partially diagrammatic in form of a tape playback adapter or deck embodying the invention.

Referring first to FIG. 1, playback adapter tape or deck 10 comprises a cabinet 12 into one end of which a prerecorded multiple track tape cartridge 14 can be inserted for instant, automatic playing. On panel 15 of the cabinet is a switch or solenoid 16 by means of which any one of a plurality of tracks can be selected for reproduction of the audio program magnetically recorded thereon. Volume control is provided for by merely adjusting the usual radio volume of the radio in the automobile.

Figure 2:
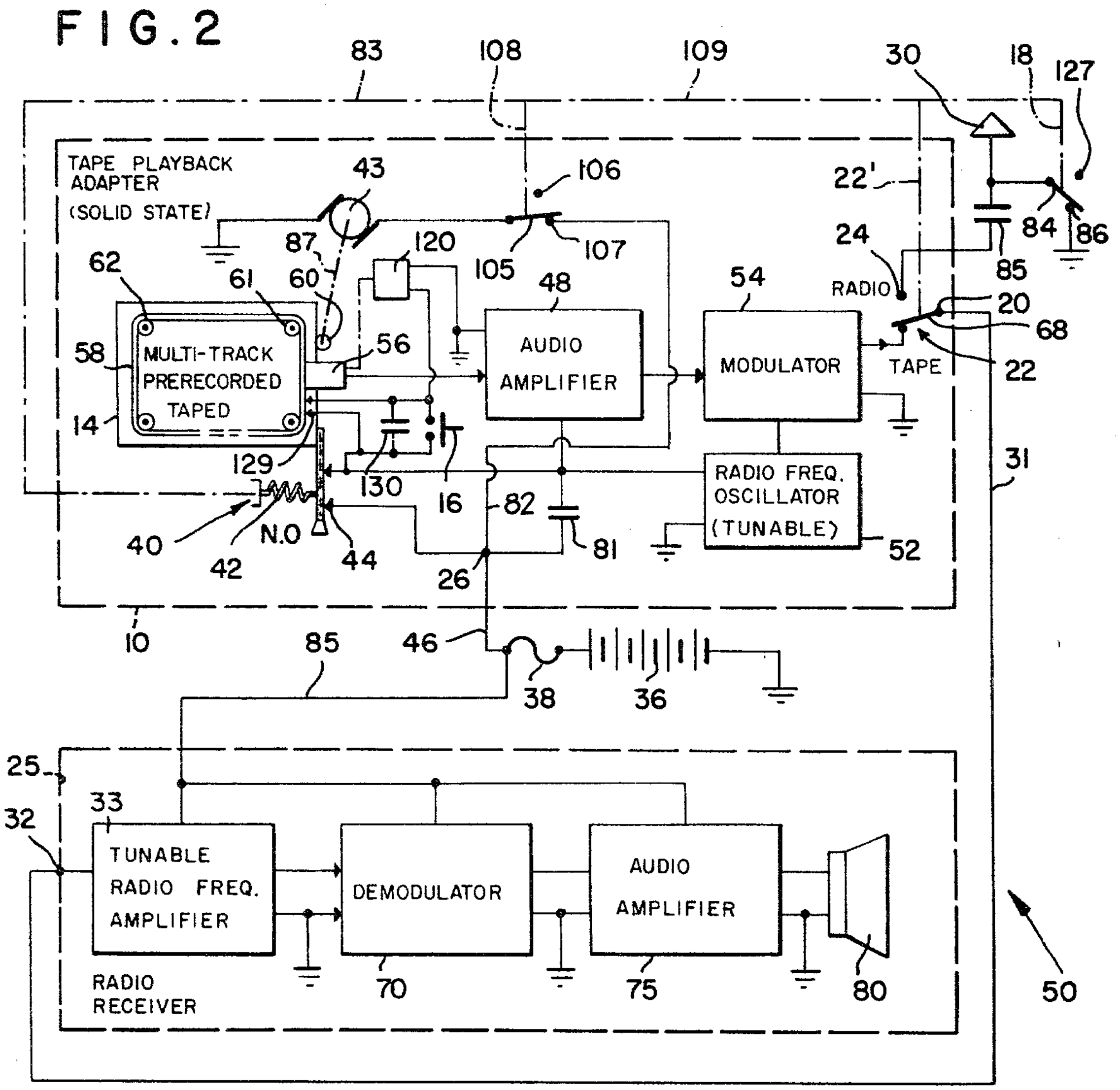
FIG. 2 is a diagram of a system including the tape playback adapter, an automobile radio receiver and power supply.

FIG. 2 in particular shows details of the entire system 50 into which the tape playback adapter 10 is integrated. The system also includes a solid state, transistorized amplitude or frequency modulation radio receiver 25. Radio receiving antenna 30 is connected to output terminal 24. Output signal terminal 20 is connected via jumper 31 to input terminal 32 of radio frequency state 33 of the radio receiver. Switch 22 in TAPE position enables connection of output terminal 20 to the radio receiver. In RADIO position the switch 22 enables direct connection of the radio antenna in the automobile to the radio receiver via terminal 24. Terminal 26 is provided to connect the tape playback adaptor to the battery power supply of the automobile. Power supply terminal 26 is connected to battery 36 of the automobile in which the system is installed, via fuse 38 located at the fuse block of automobile.

The cartridge 14 is inserted into the playback adaptor 10 so as to operate pushbutton switch 40. This switch is biased to normally open position by a spring 42. When the cartridge is inserted in the adapter, switch 40 closes to bridge terminals 44 connected in power supply hot-wire line 46. This supplies power to selenoid 120, audio amplifier stage 48, radio frequency oscillator 52 and amplitude modulator 54. Magnetic pickup head 56 picks up the audio signals recorded on a selected track of endless magnetic tape 58 in cartridge 14. Motor 43 in adapter 10 drives by mechanical connecting means 128 a capstan 60 which in turn contacts and drives tape 58 which is carried on drive roller 61 and transfer rollers 62 in cartridge 14. Means 128 includes FIG. 3 elements such as 113 (belt), 111 (flywheel), for example.

The audio signals picked up by head 56 are applied to a low power high fidelity audio amplifier stage 48. The tunable radio frequency oscillator 52 is tunable internally in the adapter. It generates a carrier which is applied to amplitude modulator 54. This modulates the audio signals fed from stage 48, upon the radio frequency carrier. The amplitude radio frequency carrier is applied to terminal 66 of switch 22. When arm 68 is thrown to terminal 66 at TAPE position, the amplitude or frequency modulated signals are fed via output terminal 20 and jumper 31 to radio frequency input terminal 32 of radio receiver 25. When arm 68 is thrown to terminal 24 at Radio position, the switch 22 connects antenna 30 to jumper 31 and radio input terminal 32 via terminals 20 and 24.

In radio receiver 25, the received amplitude or frequency modulated program from the playback adapter 10 is demodulated by demodulator 70 and the audio output is amplified by high fidelity audio amplifier stage 75. The amplified audio signals are reproduced by the high quality loudspeaker 80. The amplifier stages 33 and 75 and the demodulator 70 are energized by battery 36 connected to the radio receiver via fuse 38 and power line 85.

By the arrangement and circuitry described; it will be apparent that the tape cartridge playback adapter is integrated into the radio, audio and electrical system of the automobile. The user has the benefit of the superior audio amplifier and loudspeaker of the radio receiver. No internal changes in the radio receiver are required. The external antenna is automatically (by cartridge withdrawal) selectively connected to the radio receiver to supply radio broadcast programs in conventional fashion when switch 22 on the adapter is automatically (by cartridge withdrawal) set to RADIO position. The cartridge can be pulled out of the adapter and instantly replaced with another. The transistorized, solid state stages of the adaptor provide instant audio reproduction through the transistorized radio receiver 25. The conventional (or any desired) radio volume control (not shown) of the radio receiver can be used to control volume to satisfactory levels during cartridge insertion. The volume control 18 can be omitted if desired to effect a further saving in cost and simplification of the circuitry of the adapter 10.

In any case the adapter is so integrated into the radio and electrical system of the automobile, that it derives its power from the car battery, it transmits audio signals via the radio frequency and demodulator stages of the receiver, and reproduces the audio program via the audio amplifier stage and loudspeaker of the radio receiver.

The adapter or playback deck described, will fulfill a long felt need in the art to provide the user of a tape cartridge playback device with the same high quality of audio reproduction that he obtains from the high quality transistorized radio receiver in his automobile. While an automobile radio receiver has been referred to, it will be understood that the invention is applicable to any home radio receiver or portable radio receiver.

Figures 3, 4:
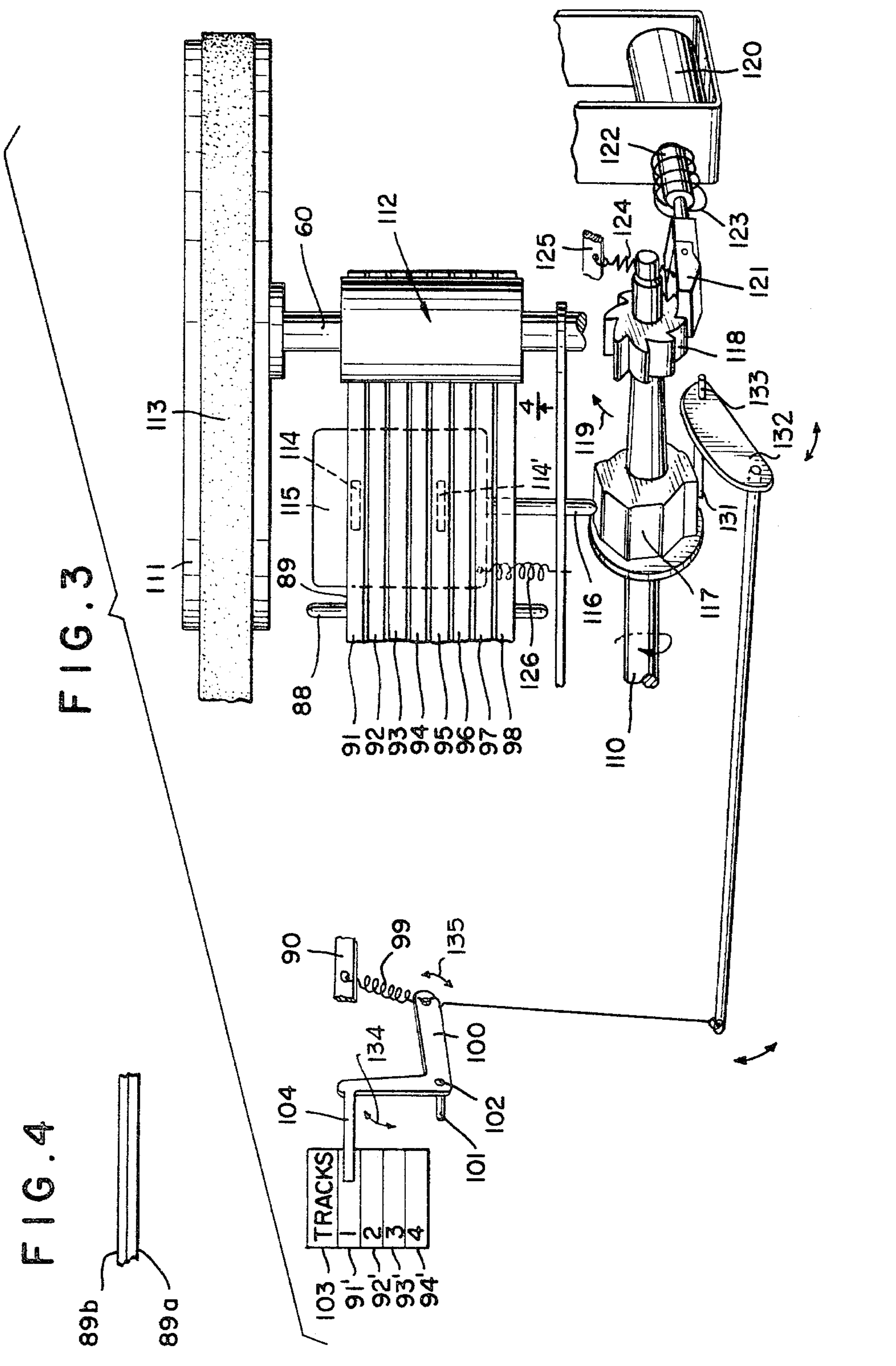

In FIG. 3, drive belt 113 drives flywheel 111, the belt 113 being driven by motor 43 (FIG. 2). Revolving wheel 111 driven the axis capstan 60 on which is mounted the rubber pressure roller 112 (inside tape cartridge) across which is drawn stereo tape 89 adjacent and guided by guide 88, with the tape in contact with tape head 115 (shown using tracks 1 and 5 — labeled as channels 91 and 95). The head picks-up through each of slits 114 and 114' of head 115 from a stereo tape. The separate signals picked-up at 114 and 114' are electronically combined (not shown) by conventional and/or desired circuitry to produce a mono-signal for a mono-signal-playing radio. For a stereo radio the signals picked-up at slits 114 and 114'. The eight tape channels are referred to as channels 91 through 98 and are stereo-matched as tracks: 1 and 5; 2 and 6; 3 and 7; and 4 and 8. The head 115 is moved by actuation of selenoid 120 which actuates retraction linear axial movement of shaft 122 normally held in the extended position by return-spring 123 against rotary ratchet 118 by pivoted shaft-head 121 tensioned in ratchet engaging-direction by spring 124 supported on support 125. Axis 110 is revolved in direction 119 by ratchet 118 movement, and eccentric cam 117 is mounted on axis 110. Spring 126 tensions head 115 in a direction such that transfer pin 116 against cam 117, whereby the revolved 114 and 114' relative to the tape channels 91 through 98.

Similarly spring 99 (supported by support 90) secures element 100 such that transfer key 131 controls pivot movement around pivot pin 133 in direction 134 to impart motion to member 100 in direction 135 in pivoted movement around pin 101 for movement of indicator arm 104 in direction 134 in front of tracks-dial 103 having labels 91' through 94' corresponding to channels 91–95, 92–96, 93–97, and 94–98.

Intermittently on the tape, a tin foil **89*b* is laminated on the recording tape face 89*a* such that circuit between opposing contacts of switch 129 is closed to thereby activate selenoid 120.**

In the following claims the term "cartridge" shall be deemed to refer also to cassettes or any other type of magazine containing a reel of prerecorded tape.

I claim:

1. A playback system for a multitrack prerecorded tape cartridge, comprising: a tape playback adapter means, said adapter means including a cabinet adapted for inserting said tape cartridge therein; a motor in the cabinet for driving the pre-recorded tape; a magnetic head in the cabinet for magnetically picking up a recorded audio program from selected tracks on the tape; an audio amplifier stage connected to said head for amplifying audio signals picked up by the head; a radio frequency oscillator for generating a radio frequency carrier; a modulator and a modulator circuit means connecting said oscillator and audio amplifier stage to the modulator for modulating the audio signals on the carrier; two terminals including one modulator terminal being connectable to a radio frequency input terminal of a radio receiver, the other terminal being an antenna terminal being connectable to a radio frequency receiving antenna; a two-position switch selectively connecting said modulator to either of said modulator terminal and said antenna terminal, for selectively applying to said radio receiver the amplitude modulated signals from the modulator, and radio broadcast signals picked up by said antenna; a radio frequency receiving antenna lead connected through a condenser to said other output terminal of the adapter means whereby when said two-position switch connects the amplitude modulator of the adapter to said radio frequency amplifier stage lead for the radio receiver, and when set to its other position connects the antenna lead to the radio frequency amplifier stage lead of the radio receiver, said two-position switch being activatable and deactivatable by insertion and withdrawal of said tape cartridge into said cabinet; a power supply lead and a power switch activatable and deactivatable to make and break circuit in power lines to said supply lead by insertion and withdrawal of said tape cartridge into said cabinet, said oscillator being tunable to any one frequency in the amplitude modulation broadcast band; and including said adapter further comprising solenoid means for selectively connecting said head to any selected track on said tape to pick-up a selected prerecorded program therefrom and applying the same to said audio amplifier.

2. A playback system for a multitrack prerecorded tape cartridge, comprising: a tape playback adapter means, said adapter means including a cabinet adapted for inserting said tape cartridge therein; a motor in the cabinet for driving the prerecorded tape; a magnetic head in the cabinet for magnetically picking up a recorded audio program from selected tracks on the tape; an audio amplifier hinge connected to said head for amplifying audio signals picked up by the head; a radio frequency oscillator for generating a radio frequency carrier; a modulator and a modulator circuit means connecting said oscillator and audio amplifier stage to the modulator for modulating the audio signals on the carrier; two terminals including one modulator terminal being connectable to a radio frequency input terminal of a radio receiver, the other terminal being an antenna terminal being connectable to a radio frequency receiving antenna; a two-position switch selectively connecting said modulator to either of said modulator terminal and said antenna terminal, for selectively applying to said radio receiver the amplitude modulated signals from the modulator, and radio broadcast signals picked up by said antenna; a radio frequency receiving antenna lead connected through a condenser to said other output terminal of the adapter means thereby when said two-position switch is activatable by being set to one position the two-position switch connects the amplitude modulator of the adapter to said radio frequency amplifier stage lead for the radio receiver, and when set to its other position connects the antenna lead to the radio frequency amplifier stage lead of the radio receiver, said two-position switch being activatable and deactivatable by insertion and withdrawal of said tape cartridge into said cabinet; a power supply lead and a power switch activatable and deactivatable to make and break circuit in power lines to said supply lead by insertion and withdrawal of said tape cartridge into said cabinet, said oscillator being tunable to any one frequency in the amplitude modulation broadcast band; and in which said adapter further includes selector structure tunable of said two-position switch to said modulator terminal from said antenna terminal upon insertion of said tape cartridge into said cabinet and turnable of said two-position switch to said antenna terminal from said modulator terminal upon withdrawal of said inserted tape cartridge form said cabinet.

3. The playback system of claim 2, further comprising an amplitude modulated, radio receiver comprising a tunable radio frequency amplifier stage connected to said one terminal of the adapter, a demodulator connected to said radio frequency amplifier stage for demodulating amplitude modulated signals applied thereto, a high fidelity audio amplifier connected to said demodulator for amplifying audio signals derived from the demodulator; a high quality loud-speaker connected to said high fidelity audio amplifier for reproducing audibly with high fidelity the audio signals amplified by the last named audio amplifier; a battery power supply, and electrical power lines connecting said battery power supply to the motor, audio amplifier stage, oscillator and modulator in said adapter, and also connecting said battery power supply to said radio frequency stage, demodulator and audio amplifier in said radio receiver; and said adapter further comprising solenoid means for selectively connecting said head to any selected track on said tape to pick-up a selected prerecorded program thereform and applying the same to said audio amplifier.

4. The playback system of claim 3, including said adapter further comprising solenoid means for selectively connecting said head to any selected track on said tape to pick-up a selected prerecorded program therefrom and applying the same to said audio amplifier.

5. A playback system for a multitrack prerecorded tape cartridge, comprising: a tape playback adapter means, said adapter means including a cabinet adapted for inserting said tape cartridge therein; a motor in the cabinet for driving the prerecorded tape; a magnetic head in the cabinet for magnetically picking up a recorded audio program from selected tracks on the tape; an audio amplifier stage connected to said head for amplifying audio signals picked up by the head; a radio frequency oscillator for generating a radio frequency carrier; a modulator and a modulator circuit means connecting said oscillator and audio amplifier stage to the modulator for modulating the audio signals on the carrier; two terminals including one modulator terminal being connectable to a radio frequency input terminal of a radio receiver, the other terminal being an antenna terminal being connectable to a radio frequency receiving antenna; a two-position switch selectively connecting said modulator to either of said modulator terminal and said antenna terminal, for selectively applying to said radio receiver the amplitude modulated signals from the modulator, and radio broadcast signals picked up by said antenna; a radio frequency receiving antenna lead connected through a condenser to said other output terminal of the adapter means whereby when said two-position switch is activatable by being set to one position the two-position switch connects the amplitude modulator of the adapter to said radio frequency amplifier stage lead for the radio receiver, and when set to its other position connects the antenna lead to the radio frequency amplifier stage lead of the radio receiver, said two-position switch being activatable and deactivatable by insertion and withdrawal of said tape cartridge into said cabinet; a power supply lead and a power switch activatable and deactivatable to make and break circuit in power lines to said supply lead by insertion and withdrawal of said tape cartridge into said cabinet, said oscillator being tunable to any one frequency in the amplitude modulation broadcast band; and including an antenna-grounding swtich means attached to said antenna lead such that a radio signal picked up by a radio antenna will be grounded and not interfere with the signal from the prerecorded tape, and such that radiation of radio frequency from the automobile antenna lead will be prevented.

6. The playback system of claim 5, in which said adapter further includes selector structure tunable of said two-position switch to said modulator terminal from said antenna terminal upon insertion of said tape cartridge into said cabinet and turnable of said two-position switch to said antenna terminal from said modulator terminal upon withdrawal of said inserted tape cartridge from said cabinet.

7. The playback system of claim 5, including said adapter further comprising solenoid means for selectively connecting said head to any selected track on said tape to pick-up a selected prerecorded program therefrom and applying the same to said audio amplifier.

8. The playback system of claim 5, further comprising an amplitude modulated, radio receiver comprising a tunable radio frequency amplifier stage connected to said one terminal of the adapter, a demodulator connected to said radio frequency amplifier stage for demodulating amplitude modulated signals applied thereto, a high fidelity audio amplifier connected to said demodulator for amplifying audio signals derived from the demodulator; a high quality loud-speaker connected to said high fidelity audio amplifier for reproducing audibly with high fidelity the audio signals amplified by the last named audio amplifier; a battery power supply, and electrical power lines connecting said battery power supply to the motor, audio amplifier stage, oscillator and modulator in said adapter, and also connecting said battery power supply to said radio frequency stage, demodulator and audio amplifier in said radio receiver; and said adapter further comprising solenoid means for selectively connecting said head to any selected track on said tape to pick-up a selected prerecorded program therefrom and applying the same to said audio amplifier.

9. The playback system of claim 8, in which said adapter further includes selector structure tunable of said two-position switch to said modulator terminal from said antenna terminal upon insertion of said tape cartridge into said cabinet and turnable of said two-position switch to said antenna terminal from said modulator terminal upon withdrawal of said inserted tape cartridge from said cabinet.

10. The playback system of claim 5, including said adapter further comprising solenoid means for selectively connecting said head to any selected track on said tape to pick-up a selected prerecorded program therefrom and applying the same to said audio amplifier.

11. The playback system of claim 10, and said adapter further including selector structure turnable of said two-position switch to said modulator terminal from said antenna terminal upon insertion of said tape cartridge into said cabinet and turnable of said two-position switch to said antenna terminal from said modulator terminal upon withdrawal of said inserted tape cartridge from said cabinet.

12. The playback system of claim 11, further comprising an amplitude modulated, radio receiver comprising a tunable radio frequency amplifier stage connected to said one terminal of the adapter; a demodulator connected to said radio frequency amplifier stage for demodulating amplitude modulated signals applied thereto; a high fidelity audio amplifier connected to said demodulator for amplifying audio signals derived from the demodulator; a high quality loud-speaker connected to said high fidelity audio amplifier for reproducing audibly with high fidelity the audio signals amplified by the last named audio amplifier; a battery power supply, and electrical power lines connecting said battery power supply to the motor, audio amplifier stage, oscillator and modulator in said adapter, and also connecting said battery power supply to said radio frequency stage, demodulator and audio amplifier in said radio receiver; and said adapter further comprising solenoid means for selectively connecting said head to any selected track on said tape to pick-up a selected prerecorded program therefrom and applying the same to said audio amplifier.

* * * * *